(12) United States Patent
Judd et al.

(10) Patent No.: US 7,103,312 B2
(45) Date of Patent: Sep. 5, 2006

(54) METHOD AND APPARATUS FOR BAND-TO-BAND TRANSLATION IN A WIRELESS COMMUNICATION SYSTEM

(75) Inventors: Mano D. Judd, Rockwall, TX (US); Kevin W. Ommodt, Allen, TX (US)

(73) Assignee: Andrew Corporation, Orland Park, IL (US)

( * ) Notice: Subject to any disclaimer, the term of this patent is extended or adjusted under 35 U.S.C. 154(b) by 493 days.

(21) Appl. No.: 09/960,460

(22) Filed: Sep. 20, 2001

(65) Prior Publication Data

US 2003/0054763 A1 Mar. 20, 2003

(51) Int. Cl.
*H04B 7/14* (2006.01)

(52) U.S. Cl. .......................... 455/20; 455/22; 455/522.1

(58) Field of Classification Search ............... 455/11.1, 455/14–20, 426, 446–447, 552.1, 561, 13.1–13.3, 455/22, 25, 74, 93, 449; 370/315–328
See application file for complete search history.

(56) References Cited

U.S. PATENT DOCUMENTS

| 4,783,843 | A | | 11/1988 | Leff et al. ...................... 455/22 |
|---|---|---|---|---|
| 4,941,200 | A | | 7/1990 | Leslie et al. ................... 455/17 |
| 5,509,028 | A | | 4/1996 | Marque-Pucheu .......... 375/211 |
| 5,604,789 | A | * | 2/1997 | Lerman ....................... 455/454 |
| 5,659,879 | A | * | 8/1997 | Dupuy ......................... 455/15 |
| 5,802,452 | A | | 9/1998 | Grandfield et al. ............ 455/20 |
| 5,812,933 | A | | 9/1998 | Niki ............................. 455/16 |
| 5,835,128 | A | | 11/1998 | Macdonald et al. ........... 348/8 |
| 5,883,884 | A | * | 3/1999 | Atkinson .................... 370/279 |
| 5,890,055 | A | | 3/1999 | Chu et al. ..................... 455/16 |
| 6,047,177 | A | * | 4/2000 | Wickman ................. 455/422.1 |
| 6,141,533 | A | | 10/2000 | Wilson et al. .............. 455/11.1 |
| 6,243,577 | B1 | * | 6/2001 | Elrefaie et al. ........... 455/426.2 |
| 6,404,775 | B1 | * | 6/2002 | Leslie et al. ................. 370/466 |
| 6,684,058 | B1 | * | 1/2004 | Karacaoglu et al. ........... 455/20 |
| 6,690,662 | B1 | | 2/2004 | Komara et al. ............. 370/342 |

FOREIGN PATENT DOCUMENTS

| DE | 40 08 165 A1 | 8/1991 |
|---|---|---|
| EP | 0 714 218 A1 | 5/1996 |
| EP | 0 756 392 A2 | 1/1997 |
| EP | 1 143 554 A2 | 10/2001 |
| WO | WO 97/32442 A1 | 9/1997 |
| WO | WO 01/11797 A1 | 2/2001 |

* cited by examiner

*Primary Examiner*—Melur Ramakrishnaiah
(74) *Attorney, Agent, or Firm*—Wood, Herron & Evans, LLP (57) ABSTRACT

A translator for translating RF signals from one wireless frequency band to another wireless frequency band in a wireless communications system including a base station, a remote antenna, and remote customer premises equipment. The base station is an existing legacy base station, such as a PCS base station, modified to include a translator for translating RF signals in a first wireless frequency band to RF signals in a second wireless frequency band. The base station transmits RF signals in the second band to a remote antenna, which includes a translator for translating the RF signals in the second band back to RF signals in the first band. The remote antenna may be located in a building or neighborhood with a coverage area as small as a picocell. A CPE (such as a mobile phone) communicates with the antenna in a first wireless frequency band, and the antenna communicates with the base station in a second wireless frequency band.

33 Claims, 7 Drawing Sheets

METHOD AND APPARATUS FOR BAND-TO-BAND TRANSLATION IN A WIRELESS COMMUNICATION SYSTEM

FIELD OF THE INVENTION

This invention relates generally to wireless communication systems, and more particularly to a wireless communication system that increases its effective capacity without extensive modification to existing legacy hardware.

BACKGROUND OF THE INVENTION

Providers of existing wireless communication systems and wireless services have significant investments in so called "legacy" equipment in order to support one or more wireless infrastructures, such as the broadband Personal Communications Services (PCS). Legacy equipment generally includes base station equipment, customer premises equipment (CPE), such as cellular phones, paging devices, and the like, and other terminal hardware. Due to the widespread use of legacy equipment, the cost of hardware to build such legacy equipment has become relatively inexpensive.

Unfortunately, although legacy equipment may be relatively inexpensive, band licenses for the necessary frequency bands to be used by that equipment are still very expensive. Providers of wireless services are currently scrambling to find additional frequency bandwidth to increase their network capacity, and therefore accommodate more customers or subscribers. The purchase of new licenses for additional frequency bands is, for some providers, a risky proposition. This is due, in part, to substantial capital that must be invested in the new hardware infrastructure to take advantage of the additional band licenses. However, some service providers already own licenses to use such additional bands, yet some of those additional bands are underutilized. For example, the MMDS band has been traditionally used to provide one-way analog wireless "cable" TV broadcast services. However, such use of the MMDS band has had only marginal success.

The base station and CPE equipment for wireless cable services are expensive to manufacture, and there are relatively few subscribers for such services. However, the MMDS band is an attractive band because it has a wider bandwidth than the PCS band, and could therefore support a higher network capacity than the PCS band. For example, a provider might own a license to use 15 MHz of the PCS band, and 200 MHz of the MMDS band in a particular geographic area.

To that end, while using the MMDS band or some other available band may be desirable to increase network capacity, generally, a new hardware infrastructure with associated CPE would be required to support the band.

Therefore, it would be desirable to increase network capacity while still using the existing legacy hardware, such as for an existing PCS infrastructure. Use of existing hardware would reduce the cost of any capacity increase. Thus, there exists a need for a wireless communication system that increases the effective capacity available to a provider of wireless services without a corresponding substantial increase in cost to the provider.

It is also desirable to implement additional bandwidth for increased capacity without a significant change in the existing hardware infrastructure.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE PREFERRED EMBODIMENTS

Although the invention will be described next in connection with certain preferred embodiments, it will be understood that the invention is not limited to those particular embodiments. On the contrary, the description of the invention is intended to cover all alternatives, modifications, and equivalent arrangements as may be included within the spirit and scope of the invention as defined by the appended claims.

The present invention relates to a wireless communication system that increases the effective frequency band and capacity of the system without extensive modification to an existing hardware infrastructure, such as legacy hardware. Translation of RF signals from one wireless communication frequency band to another wireless communication frequency band or several other wireless communication frequency bands is used. At a base station, or a first transceiving system, the inventive system translates a first RF signal from a first wireless communication frequency band into a second RF signal in a second wireless communication frequency band. Preferably, the second wireless communication frequency band has a wider bandwidth than the first wireless communication frequency band for increasing the capacity of the wireless communication system. The system then transceives the second RF signal with a second transceiving system, such as a remote antenna system which includes a stationary antenna coupled to a customer premises or building structure (e.g. a house). At the remote antenna system, the inventive system translates the second RF signal to an RF signal that is located in the first wireless communication frequency band. At the remote antenna system, the RF signal of the first band is then transceived to customer premises equipment (CPE). Alternatively, the RF signal at the remote antenna system may be in a third wireless communication frequency band, different from the first and second bands.

Figure 1:
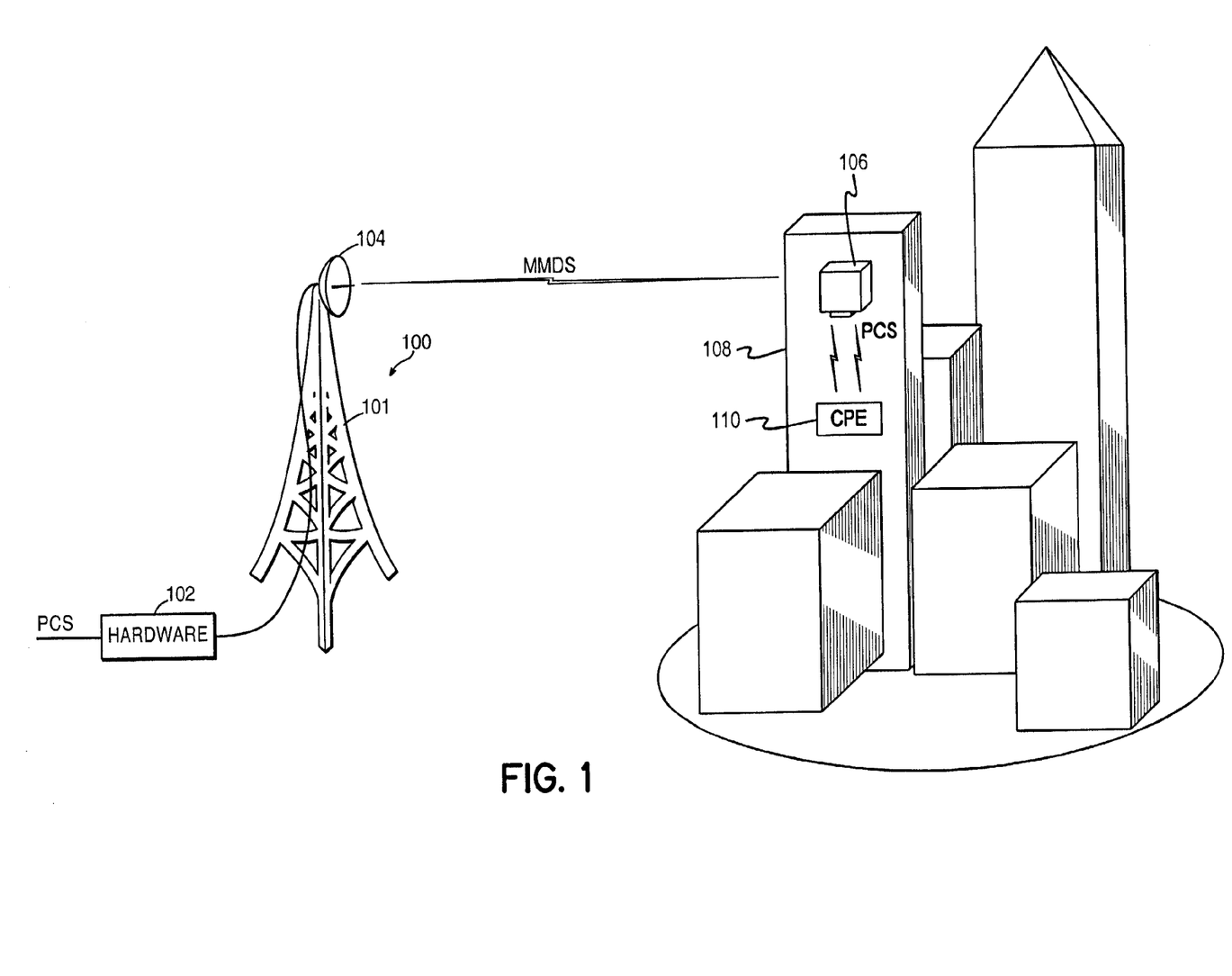
FIG. 1 shows a functional block diagram of a wireless communications system in accordance with one aspect of the present invention.

FIG. 1 shows a functional block diagram of a wireless communication system in accordance with one aspect of the present invention. A first transceiving system, such as a base station 100, is shown having a tower 101, base station hardware 102 and a base station antenna 104 supported by tower 101. The base station hardware 102, which is described in further detail in connection with FIG. 2, may include legacy equipment as currently utilized by existing base stations. The base station in a typical legacy scenario will be operable for a defined wireless communication frequency band (e.g. a cellular telephone band) such as PCS (first band), for example. By way of example only, the base station hardware 102 receives RF signals in a PCS band via a typical backhaul system from a central office or switching center. In accordance with one aspect of the present invention, the base station 100 transmits RF signals in another wireless communication frequency band (second band), which is different than the first band at which the signals are received from a central office. For example, signals in an MMDS band may be transmitted to remote customer premises equipment (CPE), such as a mobile phone located in a home or in a neighborhood picocell. Note that as discussed further below, the present invention is not limited to translation between the particular wireless frequency bands of PCS and MMDS, although those bands are used herein as examples, in describing specific embodiments of the invention.

Figure 2:
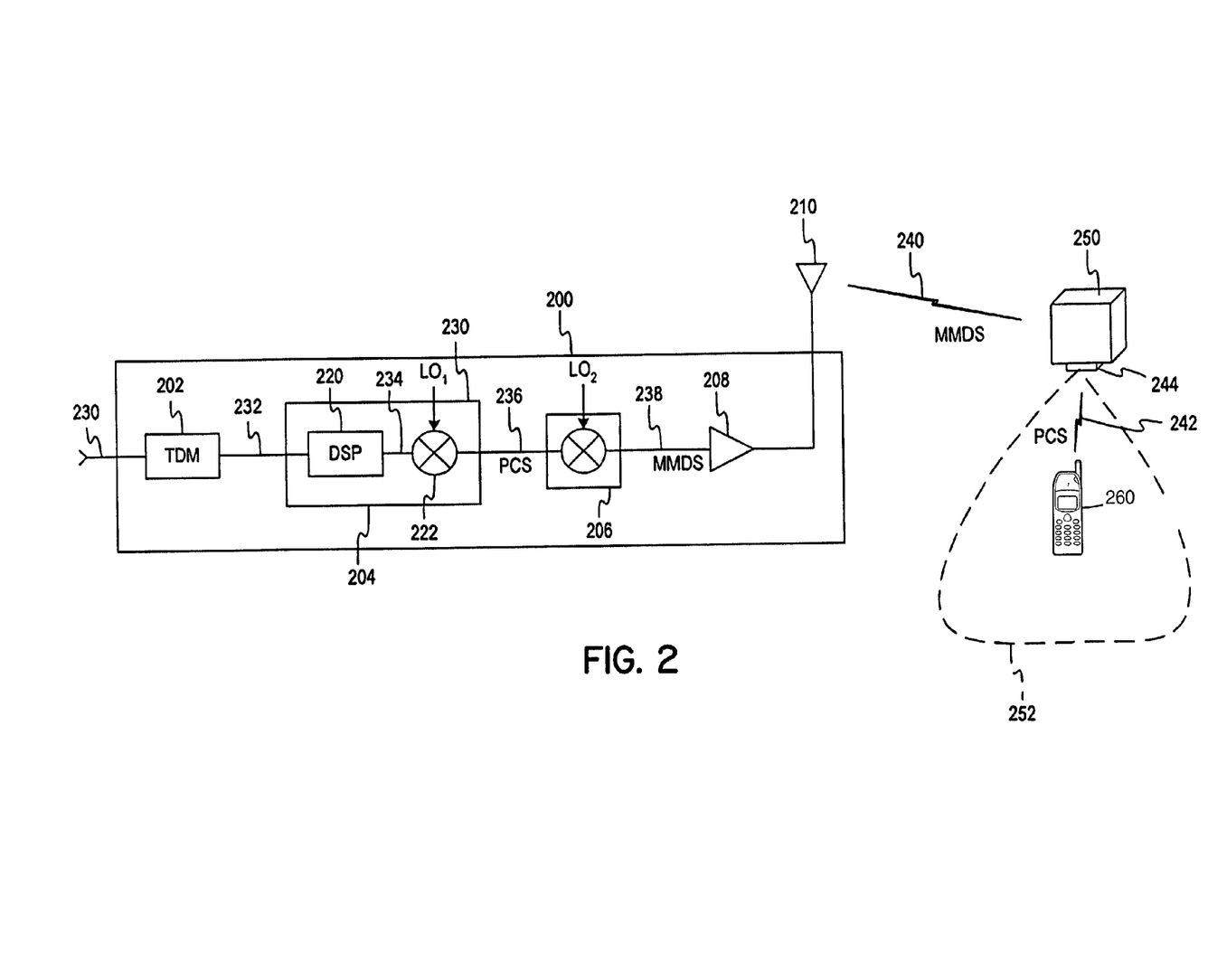
FIG. 2 shows a functional block diagram of a wireless communications system in accordance with another aspect of the present invention.

As used herein, the term "legacy equipment" refers to equipment (such as a base station or CPE) that has not been generally modified in accordance with the present invention. The inventive system or modified legacy equipment refers to equipment that operates in accordance with the present invention. For example, a modified legacy base station might be a base station that includes a translator system, as shown in FIG. 2, for example.

Using the PCS and MMDS bands as examples within the inventive system, the network capacity may be increased tenfold for a provider that operates within a 15 MHz "slice" or portion of the PCS band. Because the MMDS band is wider than the PCS band, compression of the signals is not necessary, as it is with present backhaul systems. Typical modifications to existing base station hardware 102 for the invention might be to add frequency translator systems to translate signals from the PCS to MMDS bands and suitable MMDS amplifiers. Because the remaining PCS hardware does not have to be significantly modified, a provider can "upgrade" its PCS base stations in accordance with the present invention without substantial cost. In this fashion, the provider gains a substantial increase in network capacity without incurring substantial upgrade costs. This permits the service provider to service more subscribers or customers in a geographic area for relatively similar costs as previously incurred.

Figure 8:
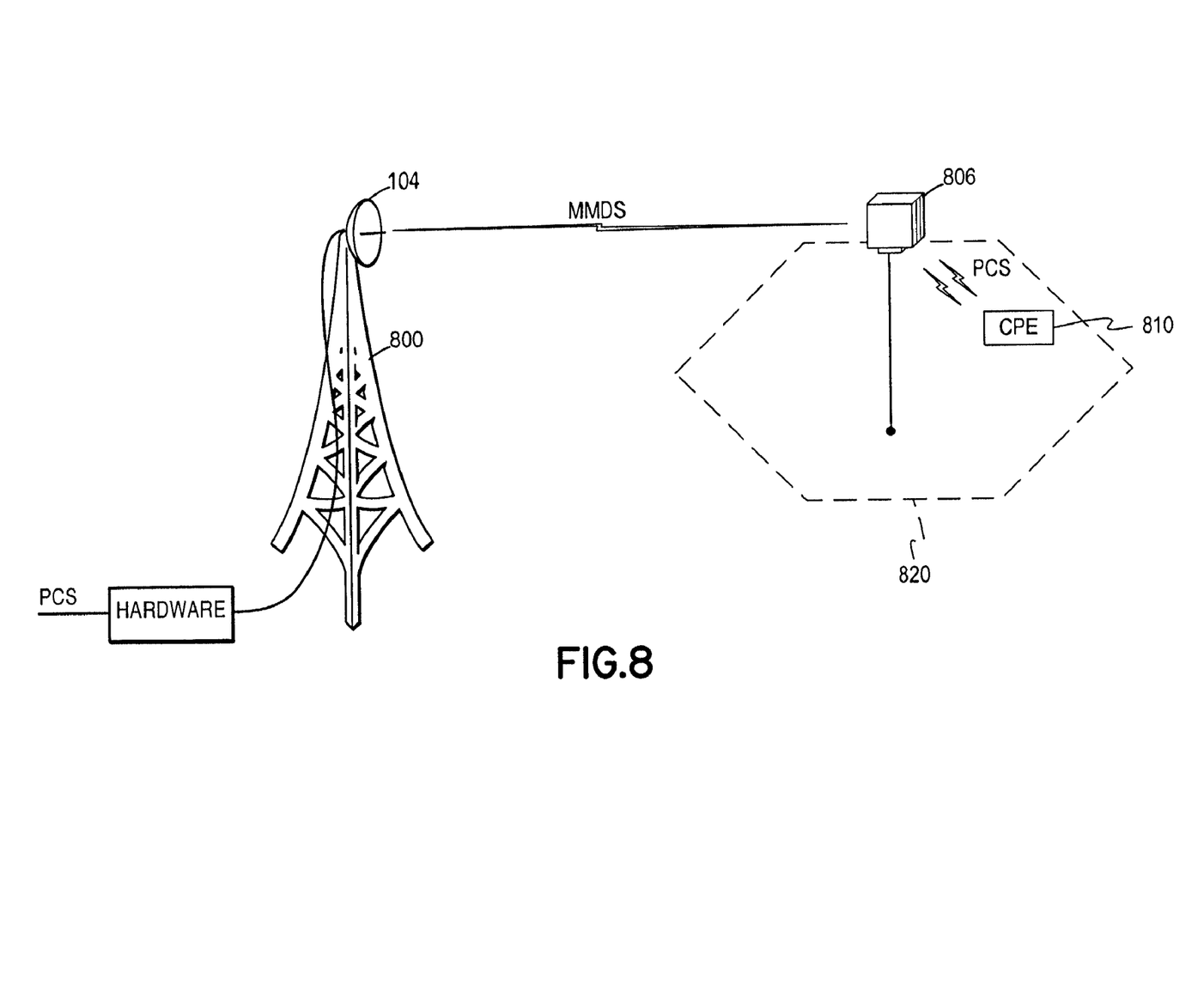
FIG. 8 shows a functional block diagram of a wireless communications system in accordance with an aspect of the present invention.

Still referring to FIG. 1 and using the PCS and MMDS bands as examples, the signals from the base station antenna 104 are transmitted in the MMDS band to a second transceiving system, such as a remote antenna system 106. The remote antenna system 106 may be located in a building 108, or in a neighborhood as shown in FIG. 8. The building 108 may be a house or other dwelling or an office complex. The remote antenna system 106 may optionally be located in the attic of a home, or near a window in a dwelling or office, or on the ceiling of a home or office, as discussed below.

The remote antenna system 106 translates the received RF signals in the MMDS band (second band) to RF signals in the PCS band (first band) which are then broadcast or re-transmitted in the first band and received by a CPE 110, such as a mobile or cellular phone, personal digital assistant (PDA), paging device, or similar wireless device. In addition, the PCS band in the building 108 has much less interference than the PCS band would have if the CPE 110 communicated directly with the base station 100. The CPE 110 outputs less power when it communicates with the remote antenna 106 located in relatively close proximity to the CPE than it would if it communicated with the base station. As a result of this reduced interference, network capacity is further increased. For example, CDMA systems are limited by interference and as additional users are added to the system, interference increases, this providing system capacity limits. Lower power CPE achievable with the invention increases the network capacity with less interference.

In addition, the remote antenna system 106 preferably uses a high gain antenna, thus extending the link gain of the system. By using the MMDS band and increasing link gain, the remote antenna 106 is more immune to RF feedback from the CPE, and without RF feedback as a concern, the remote antenna system 106 can be manufactured relatively cheaply.

FIG. 2 shows a functional block diagram of a portion of a wireless communication system in accordance with one aspect of the present invention. The system includes a base station 200, a remote antenna system 250, and a CPE 260. The base station 200 may generally include a number of subsystems, such as a time-domain multiplexer (TDM) system 202, an exciter system 204, a frequency-band translator system 206, a power amplifier 208, and an antenna 210. The exciter system 204 generally may include a digital signal process (DSP) modulator 220 and an upconverter 222. The remote antenna system 250 may take various forms as discussed below, and may include an antenna 244 for transceiving signals in a customer premises.

At the base station 200, a voice or data signal is received on line 230, such as from a central office, and is demultiplexed by the TDM system 202. The TDM system 202 provides digital signals on line 232, which are received at the exciter system 204 and appropriately modulated by the DSP modulator 220. The DSP modulator 220 modulates the digital signals on line 232 according to any one of a number of existing modulation formats, such as, for example, CDMA, TDMA, QPSK, W-CDMA, FDMA, and so forth, to provide digital IF signals on line 234 to the upconverter 222. The upconverter 222 upconverts the digital IF signals on line 234 to an appropriate RF frequency to provide RF signals on line 236, using an appropriate local oscillator ($LO_1$). The RF signals on line 236 are at a frequency in a defined first wireless communication frequency band, such as, for example, a PCS band. Next, the frequency translator system 206 translates the RF signals on line 236 to RF signals in a second defined wireless communication frequency band on line 238 using an appropriate $LO_2$. The RF signals on line 238 are then at a frequency in a second wireless frequency band, such as the MMDS bands. As noted above, the translation characteristics associated with the present invention are not specifically limited to particular wireless communication frequency bands such as PCS and MMDS. Finally, the RF signals on line 238 are amplified by the amplifier 208, such as one or more appropriate power amplifiers, and are transmitted into the air by antenna 210 as RF signals 240. The RF signals 240 are located in the second wireless communication frequency band.

The first and second wireless communication frequency bands are any two distinct communication frequency bands allocated by a recognized or authorized entity or governmental body such as the Federal Communications System (FCC) or any of its foreign counterparts (such as the European Telecommunications Standardization Institute (ETSI) in Europe, for example), which are intended to be used for wireless communications. These bands may be licensed or unlicensed. For example, the second wireless frequency bands may be the unlicensed PCS band, whose spectrum is presently located in the 20-MHz guard band between the PCS transmit and receive frequency bands. The following partial list provides examples of some of the wireless communication frequency bands contemplated by the present invention, though it is expressly understood that the following list is by no means exhaustive: Cellular 800, DCS 900, unlicensed 900 (U.S.), DCS 1800, PCS 1900, unlicensed PCS (1910–1930), UMTS 1900, UMTS 2100, MDS 2100, MMDS 2500, WCS 2300, unlicensed 2400 (worldwide), European MMDS 3500, UNII 5.1 GHz, unlicensed UNII 5.1 GHz, UNII 5.8 GHz, unlicensed UNII 5.8 GHz, and LMDS. The RF signals on lines 236 and 238 may be located in any combination of two wireless communication frequency bands selected from the foregoing list (or any other suitable wireless communication frequency bands).

Table 1 provides a few specific examples of combinations of bands which may be used in the base station 200 of FIG. 2.

TABLE 1

| Band A | Band B |
| --- | --- |
| Cellular 800 | Unlicensed 900, PCS 1900, MDS 2100, unlicensed 2400 (802.11b band), MMDS 2500, UNII 5.1 GHz, UNII 5.8 GHz |
| DCS 900 | Unlicensed 2400, European MMDS 3.5 GHz, UNII 5.1 GHz, UNII 5.8 GHz |
| DCS 1800 | Unlicensed 2400, European MMDS 3.5 GHz, UNII 5.1 GHz, UNII 5.8 GHz |
| PCS 1900 | Unlicensed 900 (U.S.), unlicensed PCS 1900, MDS 2100, WCS 2300, unlicensed 2400 (802.11b band), MMDS 2500, UNII 5.1 GHz, UNII 5.8 GHz |
| UMTS 1900/2100 | Cellular 800, PCS 1900, MDS 2100, unlicensed 2400, MMDS 2500, European MMDS 3.5 GHz, unlicensed UNII 5.1 GHz, unlicensed UNII 5.8 GHz |
| Unlicensed 2400 | MDS 2100, MMDS 2500 |
| UNII 5.1 GHz | MDS 2100, MMDS 2500 |
| UNII 5.8 GHz | MDS 2100, MMDS 2500 |
| Cellular 800, DCS 900, DCS 1800 PCS 1900, UMTS 1900, UMTS 2100, unlicensed 2400, UNII 5.1, UNII 5.8 | LMDS |

Band A represents the first wireless communication frequency band in which the RF signals on line 236 are located, and Band B represents the second wireless communication frequency band in which the RF signals on line 238 are located. Once again, it is understood that Table 1 is merely illustrative and not exhaustive of the combinations of wireless frequency bands contemplated by the present invention:

FIG. 2 illustrates a signal path within the base station 200, which is essentially a transmit path to transmit the signal in the second wireless communication frequency band. Base station 200 may also be configured to receive, as well, as will be readily understood by a person of ordinary skill in the art. Therefore, the circuitry shown associated with base station 200 may also be associated with a receive path wherein a suitable frequency splitter, such as a diplexer, may be utilized for the different transmit/receive paths, according to RF transceiving principles known to a person of ordinary skill in the art. The translation system 206 will be appropriately duplicated and modified within a receive path in order to translate received signals in the second wireless communication frequency band, such as the MMDS band, to the first wireless communication frequency band, such as the PCS band, for further processing at the central office coupled to the base station through line 230.

Note that the base station 200 shown in FIG. 2 may be an existing PCS base station, for example, having existing legacy hardware such as a PCS-CDMA exciter (shown as the exciter system 204) and a PCS power amplifier (not shown). To "upgrade" an existing PCS legacy base station in accordance with the present invention, for example, additional hardware would include the frequency-band translator systems 206, the power amplifier 208 or for amplifying signals in a second wireless frequency band (or first band for RX), and an antenna 210, if it must be modified. It is also understood that the wireless communication system contemplated by the present invention need not include a base station 200 with a tower-mounted antenna, but may include instead another transceiving stations, such as a mobile wireless device, such as wireless device 260.

Figure 3:
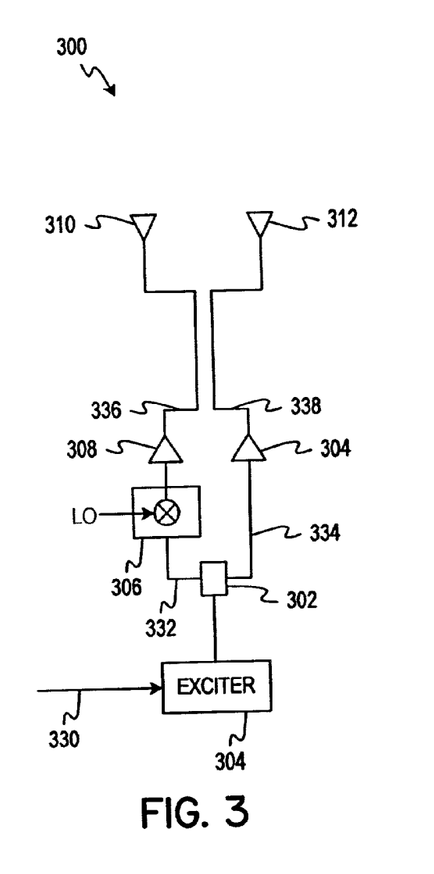
FIG. 3 shows a functional block diagram of a modified legacy base station in accordance with one aspect of the present invention.
Figure 4:
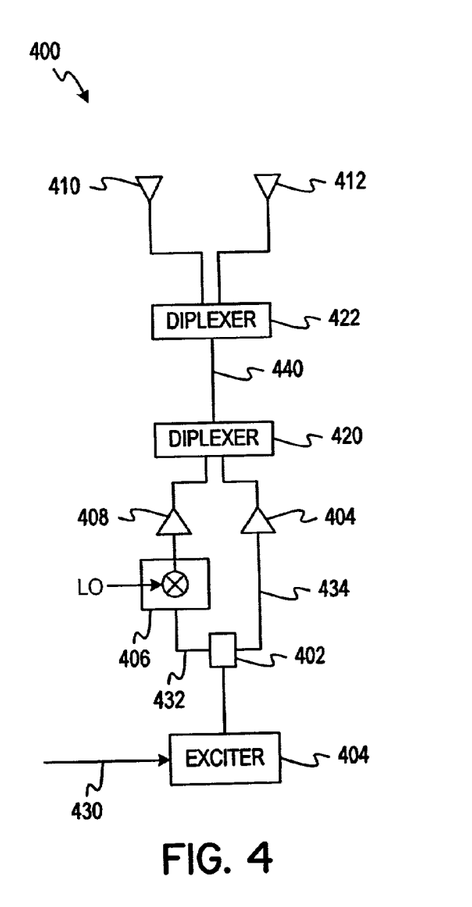
FIG. 4 shows a functional block diagram of a modified legacy base station in accordance with another aspect of the present invention.
Figure 11:
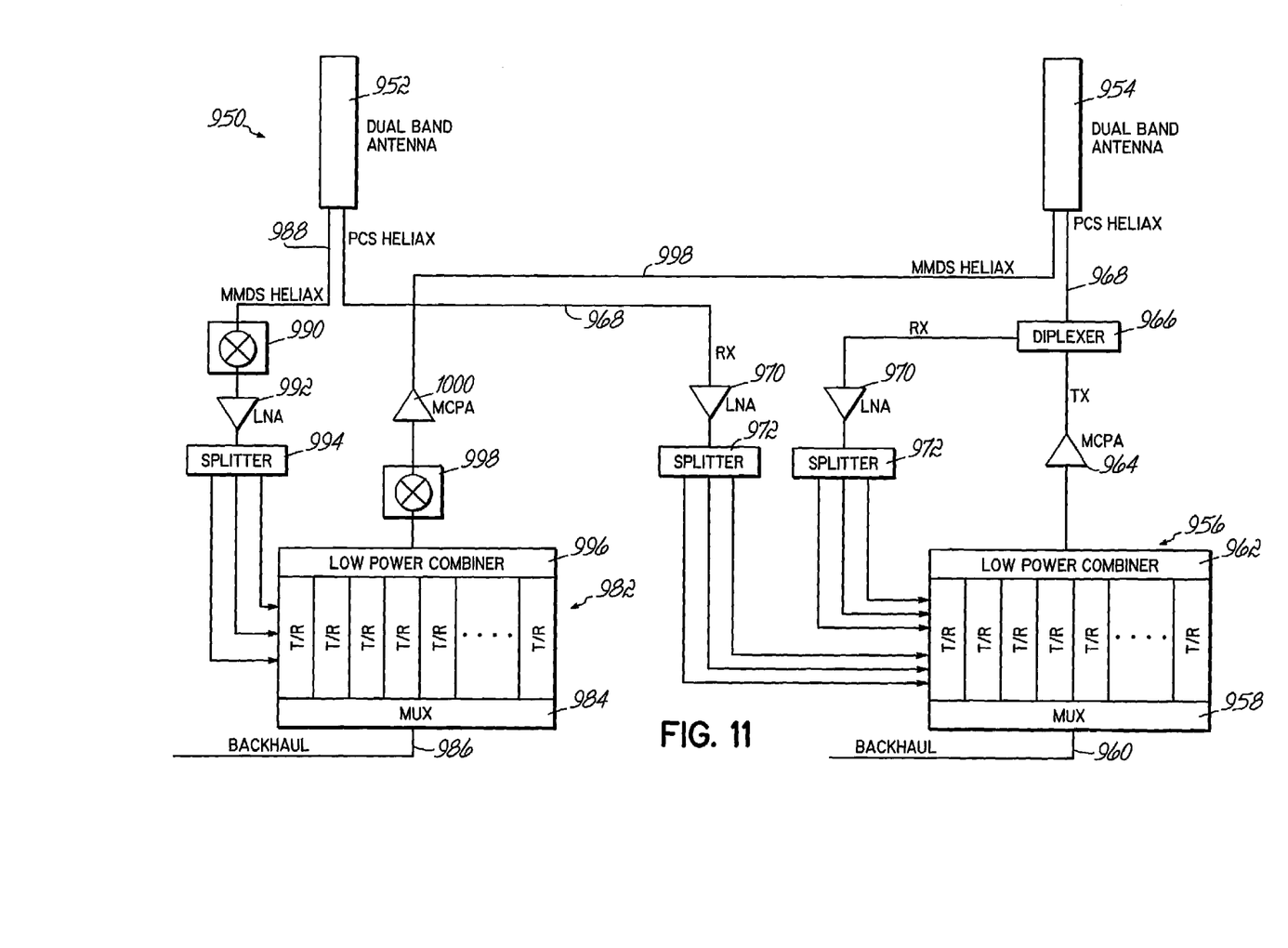
FIG. 11 illustrates a functional block diagram of an embodiment of a transceiving system in accordance with the principles of the present invention.

FIGS. 3 and 4 show a functional block diagram of alternate embodiments of a base station in accordance with the present invention. In FIG. 3, a dual-band antenna arrangement is shown. A signal is provided on line 330 to an exciter system 304. A frequency splitter 302, which may be a switch, diplexer, duplexer, or other suitable device, provides modulated RF signals on lines 332 and 334, which are located in a first wireless communication frequency band, such as a PCS band. The RF signals on line 332 are provided to a frequency-band translator system 306, such that the RF signals on line 336 are output in a second wireless frequency band, such as am MMDS band. The RF signals on line 334 are simply amplified, and the RF signals on line 338 are still located in the first frequency band, such as a PCS band. Antenna 310 transmits the RF signals in the second wireless frequency band, such as an MMDS band, into the air, and antenna 312 transmits the RF signals in the first wireless frequency band, such as a PCS band, into the air. Alternatively, rather than two separate antennas for the individual bands, the system may utilize a dual band or multiple band antenna structure as illustrated in FIG. 11.

FIG. 4 also shows a dual-band antenna arrangement, but instead of providing RF signals on individual lines 336 and 338 as shown in FIG. 3, diplexers 420 and 422 are provided such that the RF signals are combined on line 440, which carries signals located in a first and second wireless frequency band. The diplexers 420 and 422 may also be duplexers, splitters, or any other suitable devices for frequency splitting.

Referring back to FIG. 2, the remote antenna system 250 receives the RF signals 240 in the second wireless communication frequency band. The remote antenna system 250 will include any suitable antenna structure 244, such as one-way or a flat panel transceiver antenna, located inside a building, and providing coverage therein (such as the attic of a house), or located outside and providing coverage within a picocell neighborhood, such as that shown in FIG. 8. The coverage pattern or "pattern cone" of signal propagation in FIG. 2 is indicated by pattern cone 252, which pattern cone 252 is illustrative only.

A CPE 260, such as a cellular phone, is located within the pattern cone 252, and communicates with the antenna structure 244 associated with system 250. The translating hardware (shown for example in FIGS. 5 and 6) in the remote antenna system 250 translates the RF signals 240 located in the second wireless communication frequency band into RF signals 242 with frequencies located in the first wireless communication frequency band. In one embodiment, the RF signals 242 are in the same first wireless communication frequency band as the RF signals on line 236. The CPE 260 may be, for example, a PCS or 3G mobile or cellular phone operating in the 1900 MHz PCS frequency band.

In this manner, the effective frequency band of the wireless communication system shown in FIG. 2 has been increased through the use of the second wireless communication frequency band as the wireless transmission medium. Note that in the case where the first wireless frequency band is the PCS band, the CPE 260 may be any standard PCS or 3G mobile phone, and it is not necessary to manufacture an "MMDS phone," for example, in order to use the MMDS band. Thus a PCS mobile phone could be used to communicate with an MMDS base station. Alternatively, the CPE 260 may be a paging device such as a pager, a personal digital assistant (PDA), or any other suitable equipment for facilitating wireless communications.

Figure 5:
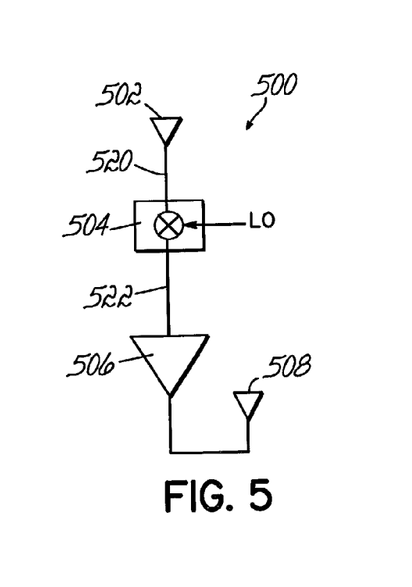
FIG. 5 shows a functional block diagram of a remote antenna in accordance with one aspect of the present invention.

Turning now to FIG. 5, a remote antenna system 500 is diagrammatically shown. The remote antenna system 500 generally includes a first antenna 502, a translator system 504, an amplifier 506, and a second antenna 508. The translator system 504 receives RF signals located in the second wireless communication frequency band on line 520 from the first antenna 502, translates them into RF signals located in the first wireless communication frequency band on line 522, and provides these signals to the amplifier 506 where they are transmitted by the second antenna 508, which may be considered a broadcast antenna to broadcast signals to a premises or a picocell associated with the remote antenna system. The translator system 504 includes any suitable mixing circuitry driven by an LO for translating signals from the first wireless communication frequency band to the second wireless communication frequency band. Mixing circuitry is known in the art and it is also known in the art how to select the appropriate local oscillator (LO) frequency to achieve the desired frequency translation. The first antenna 502 could be any suitable antenna adapted to receive signals in the second wireless communication frequency band. The second antenna 508 could be any suitable antenna adapted to transmit signals in the second wireless communication frequency band. The type of first antenna 502 and second antenna 508 employed may depend on such factors as size, cost, aesthetic appeal, or the particular frequency bands in question. FIG. 5 illustrates a receive signal path for the remote antenna system 500.

Figures 6, 7:
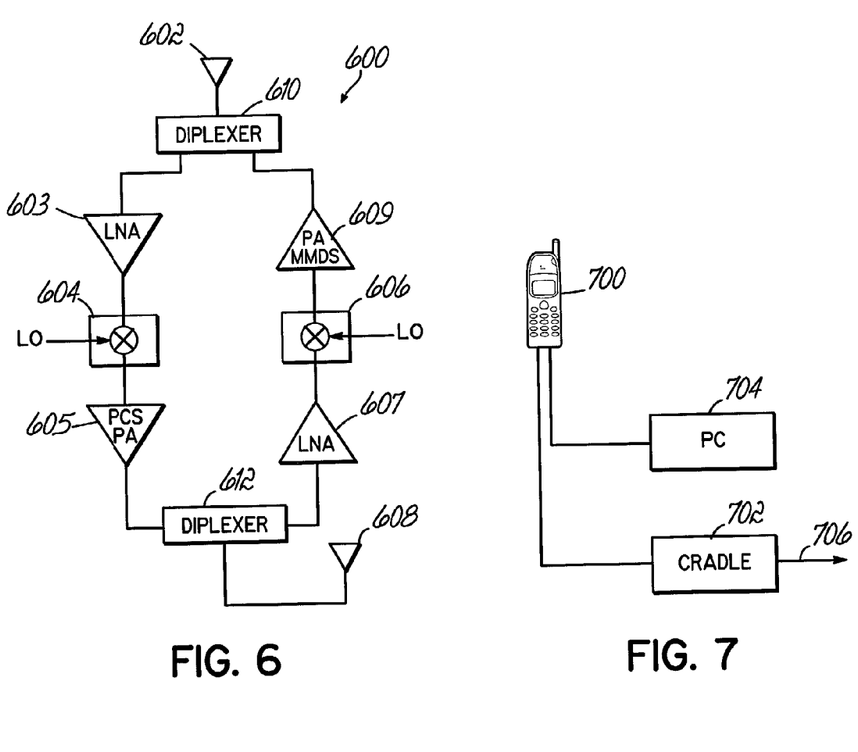
FIG. 6 shows a functional block diagram of another remote antenna in accordance with another aspect of the present invention.
FIG. 7 shows a functional block diagram of a wireless device in accordance with one aspect of the present invention.

FIG. 6 shows a transceiver system or remote antenna system in accordance with another aspect of the present invention which handles both transmission and receive traffic associated with a CPE 260. The remote antenna system 600 generally includes a first transceiver antenna 602, an LNA 603 for amplifying received signals, and a translator system 604 for translating RF signals from the second wireless communication frequency band to the first wireless communication frequency band. A power amplifier 605 (PA), operating at the PCS band (first band) amplifies the first band signals for transmission over antenna 608 to CPE. A second frequency-band translator system 606 is used for translating RF signals from the first wireless communication frequency band (e.g. PCS band) to the second wireless communication frequency band. CPE first band signals are received by antenna 608 and are amplified by an LNA 607 and translated to the second band. A power amplifier 609 operating at the second band (e.g. MMDS) then amplifies the signals to be transmitted through antenna 602. Diplexers 610 and 612 combine or split the multiple frequency signals from a single line. Diplexers are well known in the art and those of ordinary skill will appreciate that any suitable diplexer may be used as diplexers 610 and 612. The frequency translation systems utilize suitable LO signals for their translation characteristics.

In another embodiment, the wireless communication system may alternatively translate between three different wireless communication frequency bands. For example, the RF signals 242 shown in FIG. 2 may be located in a third wireless communication frequency band. The translator system of the invention utilized in the remote antenna system 250 would then not translate signals 240 back to the first wireless communication frequency band, but instead would translate the signals to a third wireless communication frequency band for use by the CPE 260. In accordance with this embodiment, the antenna 244 at the remote antenna system 250 would be any suitable antenna adapted to transmit and/or receive signals located in the third wireless communication frequency band which may be different than the first and second bands.

FIG. 7 is a functional block diagram of a wireless device 700 in accordance with a specific aspect of the present invention. The wireless device 700 is optionally coupled to a second-line phoneset cradle 702, such as the Extensis product manufactured by the assignee of the present invention, or may be electrically or wirelessly coupled to a personal computer (PC) 704, or both. The cradle 702 may include an RF-11 connector to connect the wireless device 700 to the POTS (Plain Old Telephone System), thus permitting the wireless device 700 to be used as a primary telephone in an office or home. By connecting the cradle 702 to the POTS, a home user may use her cellular phone as her primary phone. When a call to her cellular phone is received, the home user may pick up any telephone in her home to receive the call or, to place a call, the home user may use any telephone in her home to place the call, provided her cellular phone is connected to the cradle 702. Alternatively, as described above, the wireless device 700 may be coupled to a PC 704. The PC 704 may be used for data services or VoIP (voice-over IP, or Internet telephony) services, for example.

Still referring to FIG. 7, the wireless device 700 outputs less power to the second transceiver antenna, such as antenna 608 of remote antenna system 600, for example, because of the close proximity of the second transceiver antenna 608 to the wireless device 700, than the wireless device 700 would otherwise output if it were to communicate directly with a base station 100 (FIG. 1), for example. Accordingly, cross-channel interference is reduced for the inventive system, permitting more subscribers on a provider's network and thereby increasing network capacity.

Turning now to FIG. 8, there is shown a wireless communication system in accordance with another aspect of the present invention. A base station 800 translates RF signals in a PCS band to MMDS band (though other bands may be used as discussed in connection with FIG. 2), and transmits the RF signals in the MMDS band to a remote antenna system 806 located in a neighborhood. The remote antenna system 806 may be a picocell device, which has a transmitter that outputs enough power to provide propagation coverage to an area defined by a picocell 820, which may be approximately 500 to 2500 ft. in radius. The remote antenna system 806 may be affixed to a building or post, or other stable structure. It should preferably be located in the center of the area in which coverage is desired or proximate the area where coverage is most desired. The remote antenna 806 would provide coverage to a CPE 810 operating within the picocell 820. Alternatively, a larger coverage area than a picocell may be desired, and with appropriate adjustments in the gain and size of an antenna associated with the remote antenna system 806, the desired coverage may be achieved. It should be understood, however, that interference effects may increase as the coverage area increases, thereby reducing network capacity. Some providers with very wide bands may be able to increase their effective coverage area without exceeding network capacity. Others may desire smaller coverage areas to optimize network capacity in tight geographic markets, for example.

Figure 9A:
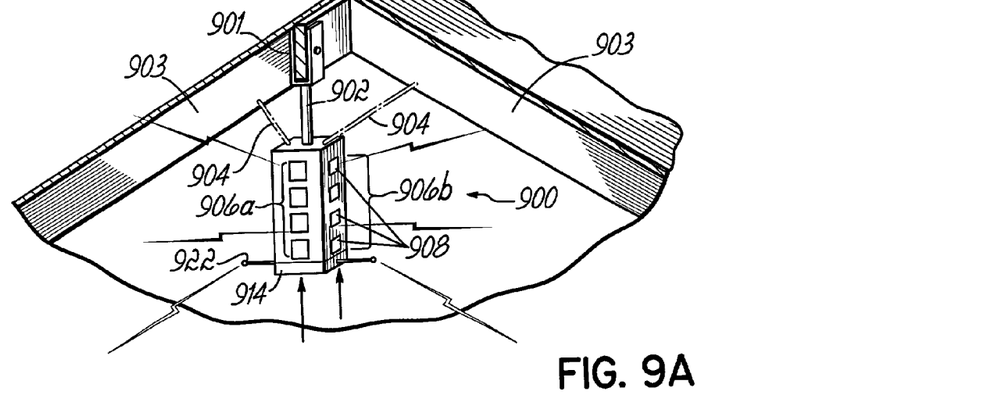
FIGS. 9A and 9B illustrate perspective views of remote antenna system embodiments in accordance with aspects of the invention.
Figure 9B:
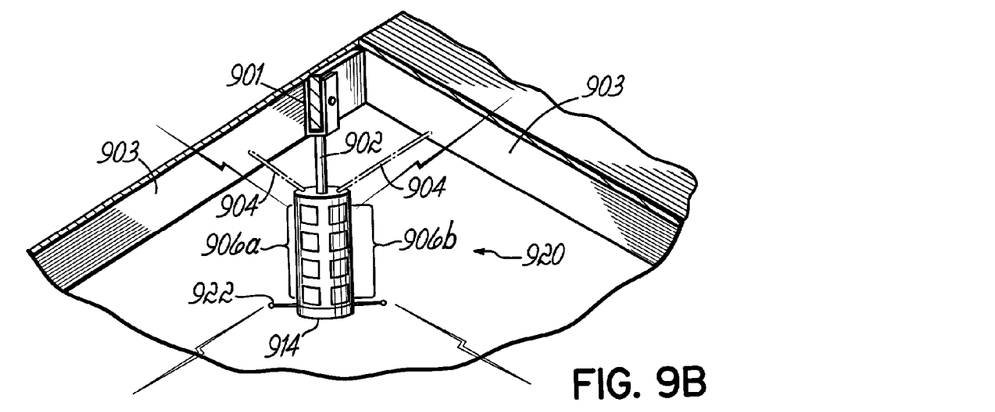

FIGS. 9A and 9B illustrate one suitable antenna system which might be utilized in accordance with the principles of the present invention. To that end, FIGS. 9A and 9B illustrate remote antenna systems which might be positioned within the attic of a home and hung from support structures therein. Attic mounting is desirable due to the higher location, lack of conductor-backed insulation in the attic, and the higher signal levels in an attic with respect to those typically found in a house. The antennas illustrated in FIGS. 9A and 9B are suitable for use in accordance with a system utilizing the band-to-band translation aspects of the present invention. Such antenna systems are also suitable for communications within a single band, such as the PCS band, and although described herein with respect to their utilization in a band-to-band translation system, are not specifically limited to such usage, as described further hereinbelow.

Referring to FIG. 9A, antenna system 900 is shown suspended from a roof beam 901 by a suitable support structure 902, or alternatively, from roof trusses 903, by support structures 904. The antenna system 900 is mounted indoors and inside the attic, and therefore does not require that a hole be made in the side of the building or house structure for running cable, such as power lines and communications lines, to the antenna system 900. Antenna system 900 is a high gain antenna and includes multiple sets of array elements, such as sets 906a, 906b, and other sets illustrated or hidden in the drawing. The sets of array elements include a plurality of individual elements 908 which cooperate to define a beam for the particular array. Therefore, each of the arrays 906a, 906b each define a beam, as do other arrays, not shown, of the antenna system 900. Antenna system 900 in FIG. 9A utilizes a box shaped structure for defining four face surfaces to contain the arrays 906a, 906b and other arrays (not shown). Other structures might also be utilized for defining a greater or lesser number of beams. Based on the directionality of the support structures, the arrays will define beams at various different directions, preferably around a 360° range.

Figure 10:
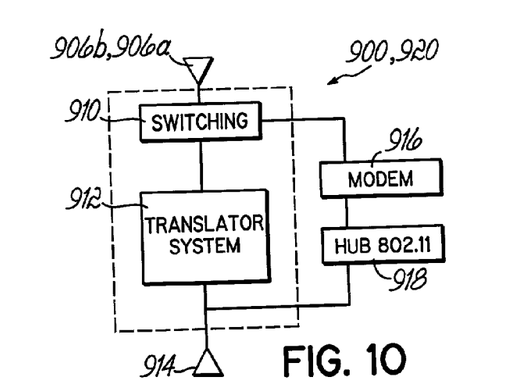
FIG. 10 illustrates a functional block diagram of a remote antenna system of one embodiment of the invention.

In accordance with one aspect of the antenna system 900, as illustrated in FIG. 10, the antenna system includes switching circuitry 910 coupled to the antenna arrays 906a, 906b. The switching circuitry is operable for switching to one of the arrays and to the beam defined thereby to automatically find the strongest signal from the base station, which signal is then used by the system. That is, the switching circuitry 910 may be utilized to automatically check each of the multiple beams to find the most appropriate beam with the greatest signal strength. Antenna system 900 also utilizes a translator system 912, including translator circuitry and suitable amplifiers, as discussed above, for translating between various bands, such as the PCS and MMDS bands. Antenna system 900 also includes antenna 914 for transceiving translated signals in another predefined band, different from the band at which the antenna arrays 906a, 906b are operating, in accordance with the principles of the present invention.

The antenna systems 900, 920 include distribution or broadcast antennas 922 which transceive and/or broadcast the signals to cover a premises or picocell and to CPE associated therewith. The antennas 922 will operate at the appropriate frequency bands, depending on the invention. For example, they might operate at a PCS band, an MMDS band, or both, or other suitable bands.

FIG. 9B illustrates an antenna system 920, similar to antenna system 900, except utilizing a structure for supporting the arrays 906a, 906b, and other arrays (not shown), which has a generally cylindrical shape, rather than a rectangular box shape.

Antenna systems 900, 920 provide a simplified installation for the service provider because the systems may switch between the various beams to find the best signal, rather than requiring specific alignment of the antenna system and constant directional adjustment of the antenna. Furthermore, installation of such antenna systems within an attic avoids the necessity of having a rooftop installation which requires two installers, under current OSHA rules. This again, results in a monetary savings to the service provider. If a service provider changes their network configuration, the antenna systems 900, 920 do not have to necessarily be repositioned, as switching between the various beams defined by the antenna systems may be utilized to again find the best beams. Attic installation is also esthetically advantageous. Alternatively, a high-gain, omni-directional antenna might be utilized as well for the remote antenna system. Other antennas, such as directional, window-mounted antennas, might be utilized with the present invention. Generally, it may be preferable to incorporate a remote antenna system in accordance with the invention, which has the second band antenna, the translation system, and the re-transmitting or broadcasting antenna in a single package. However, such elements may be separated and positioned at different places at the remote building or other locations.

While the antenna systems 900, 920 are suitable for use within the band-to-band translation system described herein, they may also be utilized without such translation. Specifically, a signal path may be provided between the element arrays 906a, 906b and the antenna 914 which does not utilize translation.

For example, referring again to FIG. 10, a signal path may be provided which circumvents any translation associated with the antenna systems 900 and 920, and instead provides a modem 916 and an 802.11 wireless hub for providing wireless Internet access. For example, the MMDS band is often utilized for wireless Internet access, and the antenna systems 900, 920 in addition to band-to-band translation, or alternative to such translation, may be utilized to provide a wireless gateway to the Internet. For example, PCs within a home or office may communicate through the antenna systems 900, 920 utilizing the 802.11 wireless hub 918. No wires would have to be run from the antenna systems to the PCs, and only power would have to be connected to the antenna systems, which includes a transceiving broadcast or distribution antenna 914 for broadcasting throughout a premises. The wireless hub 918 might also utilize an Internet firewall for the PCs serviced by the antenna systems. Therefore, the wireless hub versions of antenna systems 900, 920 eliminate the need to run coaxial cable from the antenna systems to the computers. Alternatively, a passive antenna might be utilized and wired directly to a PC having a translation system therein in combination with a first band (e.g. PCS) modem. Such systems would certainly be attractive to a premises which has multiple computer users. Accordingly, the antenna systems 900 and 920, illustrated in FIGS. 9A, 9B and 10, might be utilized to provide the desired band-to-band translation, in accordance with one aspect of the present invention. Alternatively, or in combination with such band-to-band translation, the system could also be utilized for wireless communications utilizing the MMDS band without translation, back to the PCS band. As such, in accordance with another aspect of this invention, wireless Internet access and wireless service of other CPE might be simultaneously provided.

FIG. 11 illustrates one possible embodiment of a band-to-band translation system in accordance with the principles of the present invention. FIG. 11 is illustrated and discussed with respect to translation between the PCS-1900 and the MMDS band, although translation between other bands is suitable as well. System 950, illustrated in FIG. 11, is suitable for a transceiving system, such as base station, in accordance with the principles of the present invention. To that end, system 950 includes a plurality of antennas 952, 954 which are operational at dual bands associated with the translation. Antenna 952 might be a dual band receive (RX) only antenna, whereas antenna 954 might be a dual-band transmit and receive antenna (TX/RX) for both bands. Alternatively, it might be a transceiving (TX/RX) antenna for one band, but only a receiving antenna for the other band.

In FIG. 11, antenna 952 is described with respect to the receive paths for the multiple bands, whereas antenna 954 is discussed with respect to the transmit signal paths associated with that antenna. For transmitting and receiving in the PCS band, system 950 utilizes suitable modulation hardware 956, such as CDMA modulation hardware. The modulation hardware 956 is coupled to a multiplexer 958, and to a suitable backhaul link 960 to a central office or other suitable switching center. The modulation hardware 956 provides suitably modulated signals for the various system users, according to known modulation schemes. Transmit signals from the hardware 956 are combined through a low power combiner 962 and amplified through a suitable multicarrier power amp 964 to be fed through a diplexer 966 and transmitted through antenna 954. The diplexer 966 may be coupled to antenna 954 through suitable Heliax cable 968 configured to carry a signal in a first wireless communication frequency band such as the PCS-1900 band. Similarly, if antenna 954 operates to receive signals in the first wireless communication frequency band as well, the path is provided from antenna 954 through cable 968 and diplexer 966 to one or more low noise amplifiers (LNA) 970, and to a signal splitter 972, wherein the user signals for various channels are coupled to the modulation hardware 956 where they may be further processed, multiplexed and backhauled. A similar receive path for the first wireless communication frequency band signals is provided from antenna 952, although diplexer 966 or other frequency splitting hardware would not be necessary if the antenna 952 is configured for only receiving signals in the first wireless communication frequency band.

In accordance with another aspect of the invention, system 950 is configured for additionally handling signals and a second wireless communication frequency band, such as the MMDS band, and for transceiving those signals. Such dual band operation may be accomplished with existing legacy equipment using the invention, with relatively inexpensive retrofitting costs.

Specifically, modulating hardware 982 is provided for modulating signals in a suitable fashion, such as W-CDMA, which is a desirable modulation scheme for third generation or 3G hardware. Modulation hardware 982 is coupled to a multiplexer 984 and to suitable backhaul lines for communicating with a central office or switching center. Signals received by antenna 952 in the MMDS band are coupled through Heliax lines 988 to a suitable translation system 990, such as an MMDS-to-PCS translation system. There the signal is converted from the second wireless communication frequency band to a first wireless communication frequency band, or possibly to a third wireless communication frequency band, as discussed above. The signals are suitably amplified, such as by a low noise amplifier 992 and then split by a splitter 994 and routed to the modulation hardware 982. On the transmit side, signals from the modulation hardware 982 are combined through a low power combiner 996 and then translated by translation system 998. On the transmission side, the translation system 998 is configured to convert or translate the signals from the first wireless communication frequency band (e.g. PCS-1900) to a second wireless communication frequency band (e.g. MMDS). The signals are then amplified by a suitable multicarrier power amplifier 1000 and coupled over suitable cables such as Heliax 998, to transmission antenna 954.

The system 950 illustrated in FIG. 10 can operate utilizing either a CDMA scheme, such as CDMA 2000 scheme, or a W-CDMA scheme.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

We claim:

1. A wireless communication system comprising:
   a base station with an antenna, the base station configured to predominantly communicate with customer equipment in a first wireless frequency band;
   a first translator system having as an input first RF signals located in the first wireless communication frequency band and having as an output second RF signals located in a second wireless communication frequency band;
   the antenna coupled for transceiving the second RF signals associated with the translator system;
   a remote system including a remote antenna for transceiving the second RF signals associated with the base station, the remote system having a first path and a second path, the first path including a second translator system having as an input the second RF signals, and operable to translate the frequency of the second RF signals to output RF signals located back in the first wireless communication frequency band for communicating with the customer equipment, the second path operable for outputting the second RF signals directly in the second wireless communication frequency band without frequency translation for communicating with additional customer equipment not operating in the first wireless communication frequency band.

2. The wireless communication system of claim 1 wherein the remote system further comprises a distribution antenna coupled to the translator system for transceiving the RF signals of the remote antenna system located in the first wireless communication frequency band.

3. The wireless communication system of claim 1 wherein said first and second wireless communication frequency bands are predetermined bands of a frequency spectrum allocated by an authorized entity for wireless communications.

4. The wireless communication system of claim 1 wherein at least one of said first and second wireless communication frequency bands are selected from a group of bands comprising: Cellular 800, DCS 900, unlicensed 900, DCS 1800, PCS 1900, unlicensed PCS, UMTS 1900, UMTS 2100, MDS 2100, MMDS 2500, WCS 2300, unlicensed 2400, MMDS 3500, UNII 5.1 GHz, unlicensed UNII 5.1 GHz, UNII 5.8 GHz, unlicensed UNII 5.8 GHz, and LMDS.

5. The wireless communication system of claim 1 wherein the first wireless communication frequency band is a PCS band and the second wireless communication frequency band is an MMDS band.

6. The wireless communications system of claim 1 wherein said remote system is incorporated within a picocell and propagates the signals in the first wireless communication frequency band in an area bounded by said picocell.

7. The wireless communication system of claim 1 wherein the translator associated with the remote antenna system is located inside a building.

8. The wireless communication system of claim 1 wherein the remote antenna system is located inside a building.

9. The wireless communication system of claim 1 wherein said remote antenna includes multiple arrays of antenna elements for defining multiple beams for the remote antenna.

10. The wireless communication system of claim 1 wherein said remote system includes a wireless hub for communicating with customer premises equipment.

11. A wireless communication system comprising:
a first transceiving system including an antenna and a translator system having as an input first RF signals located in a first wireless communication frequency band and having as an output second RF signals located in a second wireless communication frequency band;
the antenna coupled for transceiving the second RF signals associated with the translator system;
a second transceiving system, remote from the first transceiving system and including a remote antenna for transceiving the second RF signals associated with the base station, the second transceiving system having a first path and a second path, the first path including a second translator system having as an input the second RF signals, and operable to translate the frequency of the second RF signals to output RF signals located back in the first wireless communication frequency band for communication with the customer equipment, the second path operable for outputting the second RF signals directly in the second wireless communication frequency band without frequency translation for communication with additional customer equipment not operating in the first wireless communication frequency band.

12. The wireless communication system of claim 11 wherein the second transceiving system further comprises a distribution antenna coupled to the translator system for transceiving the RF signals of the remote antenna system located in the first and second wireless communication frequency bands.

13. The wireless communication system of claim 11 wherein said first and second wireless communication frequency bands are predetermined bands of a frequency spectrum allocated by an authorized entity for wireless communications.

14. The wireless communication system of claim 11 wherein at least one of said first and second wireless communication frequency bands are selected from a group of bands comprising: Cellular 800, DCS 900, unlicensed 900, DCS 1800, PCS 1900, unlicensed PCS, UMTS 1900, UMTS 2100, MDS 2100, MMDS 2500, WCS 2300, unlicensed 2400, MMDS 3500, UNII 5.1 GHz, unlicensed UNII 5.1 GHz, UNII 5.8 GHz, unlicensed UNII 5.8 GHz, and LMDS.

15. The wireless communication system of claim 11 wherein the first wireless communication frequency band is a PCS band and the second wireless communication frequency band is an MMDS band.

16. The wireless communications system of claim 11 wherein said second transceiver system is incorporated within a picocell and propagates the signals in the first wireless communication frequency band in an area bounded by said picocell.

17. The wireless communication system of claim 11 wherein the second transceiver system is located inside a building.

18. A wireless communication system comprising:
a base station with an antenna;
a first translator system having as an input first RF signals located in a first wireless communication frequency band and having as an output second RF signals located in a second wireless communication frequency band;
the antenna coupled for transceiving second RF signals associated with the translator system;
a remote antenna system including a remote antenna for transceiving the second RF signals associated with the base station, the remote antenna system including a second translator system having as an input the second RF signals, and operable to output third RF signals located in third wireless communication frequency band different from the first and second wireless communication frequency bands and to also output the second RF signals directly in the second wireless communication frequency band for communicating with additional customer equipment at the remote antenna system not operating in the third wireless communication frequency band.

19. The wireless communication system of claim 18 wherein the remote antenna system further comprises a distribution antenna coupled to the translator system for transceiving the RF signals of the remote antenna system located in the third wireless communication frequency band.

20. The wireless communication system of claim 18 wherein said first, second and third wireless communication frequency bands are predetermined bands of a frequency spectrum allocated by an authorized entity for wireless communications.

21. The wireless communication system of claim 18 wherein at least one of said first and second wireless communication frequency bands are selected from a group of bands comprising: Cellular 800, DCS 900, unlicensed 900, DCS 1800, PCS 1900, unlicensed PCS, UMTS 1900, UMTS 2100, MDS 2100, MMDS 2500, WCS 2300, unlicensed 2400, MMDS 3500, UNII 5.1 GHz, unlicensed UNII 5.1 GHz, UNII 5.8 GHz, unlicensed UNII 5.8 GHz, and LMDS.

22. The wireless communication system of claim 18 wherein the signals in the third wireless communication frequency band output by the remote antenna system are configured to be used by customer premises equipment.

23. The wireless communication system of claim 18 wherein said remote antenna system is also operable to output RF signals located in the first wireless communication frequency band.

24. A method for increasing capacity in a wireless communication system, the method comprising:
    translating RF signals between first RF signals located in a first wireless communication frequency band and second RF signals located in a second wireless communication frequency band;
    transceiving the second RF signals at a base station, the base station configured to predominantly communicate with customer equipment in a first wireless frequency band;
    transceiving the second RF signals with a remote antenna system located away from the base station;
    at the remote antenna system selectively directing the second RF signals in first and second paths, in the first path, translating the frequency of RF signals between said second RF signals in the second wireless frequency band and RF signals located in the first wireless communication frequency band, and in the second path, transceiving the second RF signals directly in the second wireless communication frequency band without frequency translation for communicating with additional customer equipment not operating in the first wireless communication frequency band.

25. The method of claim 24 further comprising transceiving the translated RF signals in the first wireless communication frequency band at the remote antenna system and communicating with customer premises equipment in the first wireless communication frequency band.

26. The method of claim 24, wherein said first and second wireless communication frequency bands are predetermined bands of a frequency spectrum allocated by an authorized entity for wireless communications.

27. The method of claim 26 wherein at least one of said first and second wireless communication frequency bands are selected from a group of bands comprising: Cellular 800, DCS 900, unlicensed 900, DCS 1800, PCS 1900, unlicensed PCS, UMTS 1900, UMTS 2100, MDS 2100, MMDS 2500, WCS 2300, unlicensed 2400, MMDS 3500, UNII 5.1 GHz, unlicensed UNII 5.1 GHz, UNII 5.8 GHz, unlicensed UNII 5.8 GHz, and LMDS.

28. The method of claim 24 further comprising mounting the remote antenna within a premises and transceiving the translated RF signals in the first wireless communication frequency band within the premises.

29. The method of claim 24 further comprising mounting the remote antenna within a picocell and transceiving the translated RF signals in the first wireless communication frequency band within the picocell.

30. A method for increasing capacity in a wireless communication system, the method comprising:
    translating first RF signals located in a first wireless communication frequency band to second RF signals located in a second wireless communication frequency band;
    transceiving the second RF signals at a base station;
    transceiving the second RF signals with a remote antenna system located away from the base station;
    at the remote antenna system, translating said second RF signals to RF signals located in a third wireless communication frequency band different from the first and second wireless communication frequency bands
    and also outputting the second RF signals directly in the second wireless communication frequency band for communicating with additional customer equipment at the remote antenna system not operating in the third wireless communication frequency band.

31. The method of claim 30 further comprising transceiving the translated RF signals in the third wireless communication frequency band at the remote antenna system and communicating with customer premises equipment in the third wireless communication frequency band.

32. The method of claim 30, wherein said first, second and third wireless communication frequency bands are predetermined bands of a frequency spectrum allocated by an authorized entity for wireless communications.

33. The method of claim 32 wherein at least one of said first, second and third wireless communication frequency bands are selected from a group of bands comprising: Cellular 800, DCS 900, unlicensed 900, DCS 1800, PCS 1900, unlicensed PCS, UMTS 1900, UMTS 2100, MDS 2100, MMDS 2500, WCS 2300, unlicensed 2400, MMDS 3500, UNII 5.1 GHz, unlicensed UNII 5.1 GHz, UNII 5.8 GHz, unlicensed UNII 5.8 GHz, and LMDS.

* * * * *